Figure 1:
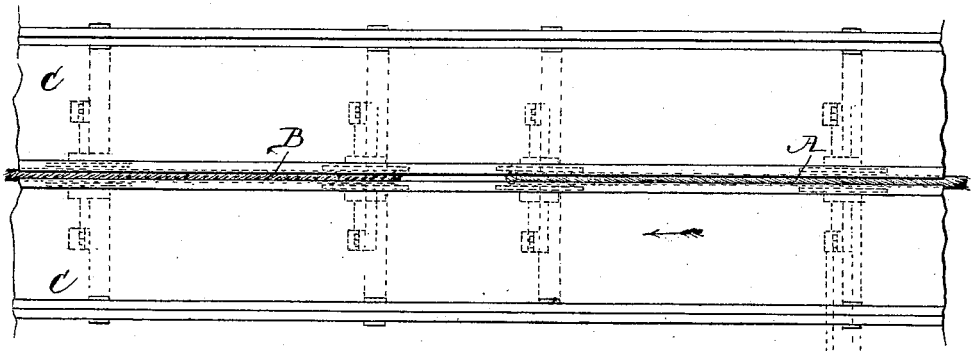

(No Model.)

A. PFERDNER.
AUTOMATIC SIGNAL FOR CABLE RAILWAYS.

No. 408,043. Patented July 30, 1889.

Witnesses
N. Rossiter
L. L. Page

Inventor
Adolph Pferdner
By Chas. G. Page
Atty.

UNITED STATES PATENT OFFICE.

ADOLPH PFERDNER, OF CHICAGO, ILLINOIS.

AUTOMATIC SIGNAL FOR CABLE RAILWAYS.

SPECIFICATION forming part of Letters Patent No. 408,043, dated July 30, 1889.

Application filed October 5, 1888. Serial No. 287,353. (No model.)

*To all whom it may concern:*

Be it known that I, ADOLPH PFERDNER, a citizen of the United States, residing at Chicago, in the county of Cook and State of Illinois, have invented a certain new and useful Improvement in Cable-Railway Systems, of which the following is a specification.

In cable railways constructed, for example, under what is known as the "Hovey system" the presence of an attendant is required at each point where the cars are to pass from one cable to another, it being the duty of the attendant to open a door over the conduit or cable-passage just before the grip-car has reached such point, whereby the attendant may note whether or no the grip preparatory to passing from one cable to another has at a proper moment dropped the first cable, since should the grip hold onto the first cable when the car passes beyond the same the cable or the grip will become injured. It is also the duty of the attendant to signal the conductor should the grip fail to drop the first cable at a proper moment, whereby the conductor may stop the car before a rupture of the cable or breakage of the grip has been effected.

The object of my invention is to entirely dispense with the services of such attendants and to provide means for automatically indicating whether or no the grip has properly dropped the first cable preparatory to passing to the next succeeding cable along the line.

To the attainment of the foregoing end, I provide a signal which is operated from a pulley adjacent to the end portion of that cable which the grip is to drop preparatory to passing forward to the next cable, whereby in case the grip should fail to drop the first cable the signal will cease its allotted regular movement, it being understood that when the cable is lifted by the grip somewhat above the pulley the latter will cease to operate, while, on the other hand, should the grip properly drop the cable the travel of the cable will cause the pulley, and hence the signal, to operate. By such means the signal can operate while the cable is running over the pulley; but when the grip reaches a point to lift the cable from the pulley, the pulley, and hence the signal, will slow up or cease to operate so long as the driving-power is absent from the pulley, but will of course start up the instant the cable is dropped. The instant, therefore, the cable is dropped by the grip the pulley and signal will be operated, whereby the conductor may then know that the said first cable has been properly released. Should, however, the signal fail to work after the grip has passed a point opposite the signal, the conductor will at once know that something is wrong, and hence can stop the car.

Various power-transmitting connections between the pulley and the signal can be employed, and various movements can be given to the signal, the devices illustrated in the accompanying drawings serving to show, however, a simple way of attaining the desired end.

Figure 2:
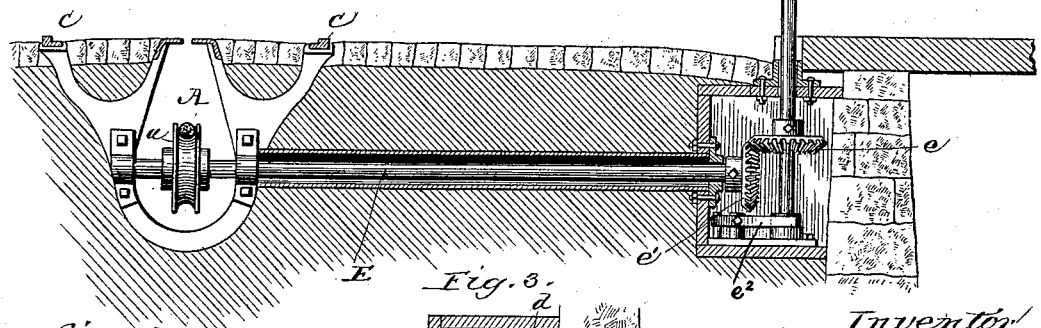
Figure 3:
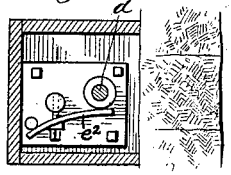

In said drawings, Figure 1 represents a plan view of a portion of a cable-railway system, and indicates in dotted lines the power-transmitting connection which is shown in elevation in Fig. 2. Said Fig. 2 represents a section taken transversely through a portion of the street and shows in elevation the cable-pulley arranged in the cable-conduit and connected with a signal device. Fig. 3 is a detail representing a sectional plan taken through Fig. 2 on a horizontal plane just above the brake.

A indicates one and B denotes the other of two cables understood to run through a conduit just under the street, and to be available to the grip of a car passing along track C, as usual.

The cars are herein understood to pass along the track in the direction of the arrow, Fig. 1, whereby the cable A may be termed the "first" cable and the cable B the "second" cable, since it is intended that the grip shall first engage cable A, and at a proper juncture drop the same and then engage cable B. Each cable has at the gap on the line at this point its allotted pulley, as in dotted lines, Fig. 1.

The signal D is operated from a pulley for the cable A through the medium of a suitably-arranged power-transmitting mechanism that can be placed under ground and conveniently extended from the conduit to a point under the sidewalk or street curbing or other suitable locality, a convenient location being at the curbing, where the signal will be out of the way of vehicles passing along the street and pedestrians passing along the sidewalk.

As an illustration of an exceedingly simple and efficient arrangement of power-transmitting mechanism, the cable A passes over a pulley $a$, arranged in the conduit at a point somewhat back of the pulley at the termination of the cable A and fixed on a horizontal shaft E, which is at one end geared to a rotary signal-rod $d$. The signal-rod can be provided with any desired signal, which at night may consist of a lantern.

The rapidity of movement on the part of the signal can be determined by the relative size of the gearing—as, for example, the larger the gear $e$ is made relatively to gear $e'$ the slower will be the rotation of the signal-rod, and hence the slower the movement of the signal.

I can also provide any suitable adjustable friction device or brake for more suddenly retarding the movement of the mechanism when the grip has raised cable A from the allotted pulley $a$, the brake $e^2$ herein shown being merely illustrative of one of many forms of brakes employed in other connections. Pulley $a$ will obviously come to or approach a state of rest when the grip of a passing car has lifted the cable therefrom, and hence the movement of the signal will be checked. Should, however, the grip fail to release cable A at the proper juncture, the conductor will become aware of such fact, since at such time the signal in place of again starting up will remain stationary; but should the grip release cable A at the proper moment said cable will drop into place on pulley $a$ and instantly operate the same, whereby the signal will be simultaneously therewith started up.

I do not regard it as necessary to illustrate the various arrangements of wheels, cranks, automatic governors, and like mechanical substitutes for the simple mechanism herein shown; nor is it regarded as necessary to show other obvious movements—such as reciprocatory, vibratory, and the like—which an intelligent mechanic with the foregoing before him could readily construct.

What I claim as my invention is—

1. In a cable-railway system, the combination, with the cable-pulley for one of two adjacent cables, of a rotary signal and a power-transmitting mechanism serving to operate the signal from said pulley, substantially as set forth.

2. In a cable-railway system, the combination, with the cable-pulley for one of two adjacent cables, of the rotary signal-rod gear connected with a rotary shaft which carries the cable-pulley, substantially as set forth.

3. In a cable-railway system, the combination, with a cable-pulley for the purpose hereinbefore set forth, of a rotary-signal support, a power-transmitting connection by which said rotary-signal support is operated from the cable-pulley, and a brake applied to check the action of the signal device when the cable is lifted from the pulley, for the purpose described.

ADOLPH PFERDNER.

Witnesses:
CHAS. G. PAGE,
L. L. PAGE.